(12) United States Patent
Moyer

(10) Patent No.: US 8,667,226 B2
(45) Date of Patent: Mar. 4, 2014

(54) SELECTIVE INTERCONNECT TRANSACTION CONTROL FOR CACHE COHERENCY MAINTENANCE

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 728 days.

(21) Appl. No.: 12/053,761

(22) Filed: Mar. 24, 2008

(65) Prior Publication Data
US 2009/0240892 A1 Sep. 24, 2009

(51) Int. Cl.
*G06F 12/00* (2006.01)

(52) U.S. Cl.
USPC .................................. 711/146; 711/E12.026

(58) Field of Classification Search
USPC .......................................... 711/146, E12.026
See application file for complete search history.

(56) References Cited

U.S. PATENT DOCUMENTS

| | | | |
|---|---|---|---|
| 4,799,199 A | 1/1989 | Scales, III et al. | |
| 4,914,573 A | 4/1990 | Scales, III et al. | |
| 5,375,216 A | 12/1994 | Moyer et al. | |
| 5,404,489 A * | 4/1995 | Woods et al. | 711/152 |
| 5,598,550 A | 1/1997 | Shen et al. | |
| 6,185,657 B1 | 2/2001 | Moyer | |
| 6,519,684 B1 | 2/2003 | Moyer | |
| 6,560,712 B1 | 5/2003 | Arends et al. | |
| 6,604,162 B1 | 8/2003 | Mosur et al. | |
| 6,954,826 B2 | 10/2005 | Moyer | |
| 6,985,972 B2 | 1/2006 | Dieffenderfer et al. | |
| 7,054,987 B1 | 5/2006 | Reed et al. | |
| 7,185,148 B2 | 2/2007 | Moyer | |
| 7,188,262 B2 | 3/2007 | Arends et al. | |
| 7,340,542 B2 | 3/2008 | Moyer et al. | |
| 2002/0178210 A1 * | 11/2002 | Khare et al. | 709/107 |
| 2006/0224837 A1 * | 10/2006 | Blumrich et al. | 711/146 |
| 2008/0109624 A1 * | 5/2008 | Gilbert et al. | 711/163 |

FOREIGN PATENT DOCUMENTS

EP 0559409 B1 7/1998

OTHER PUBLICATIONS

U.S. Appl. No. 11/969,112, filed Jan. 3, 2008.
U.S. Appl. No. 11/149,670, filed Jun. 10, 2005.

* cited by examiner

*Primary Examiner* — Larry Mackall
(74) *Attorney, Agent, or Firm* — Joanna G. Chiu

(57) ABSTRACT

A data processing system (10) includes a first master (14) and a second master (16 or 22). The first master includes a cache (28) and snoop queue circuitry (44, 52, 54) having a snoop request queue (44) which stores snoop requests. The snoop queue circuitry receives snoop requests for storage into the snoop request queue and provides snoop requests from the snoop request queue to the cache, and the snoop queue circuitry provides a ready indicator indicating whether the snoop request queue can store more snoop requests. The second master includes outgoing transaction control circuitry (72) which controls initiation of outgoing transactions to a system interconnect. In response to the ready indicator indicating that the snoop request queue cannot store more snoop requests, an initiation hold signal is provided to the outgoing transaction control circuitry to prevent the outgoing transaction control circuitry from initiating any outgoing transactions to the system interconnect (12) within a subset of transaction types.

15 Claims, 4 Drawing Sheets

SELECTIVE INTERCONNECT TRANSACTION CONTROL FOR CACHE COHERENCY MAINTENANCE

BACKGROUND

1. Field

This disclosure relates generally to data processing systems, and more specifically, to cache and memory coherency of information in data processing systems.

2. Related Art

Data processing systems typically use multiple processors, each having a closely coupled cache memory, coupled via a system communication bus to a system memory. Cache memory stores a subset of duplicative information that is stored in the system memory. Each cache in the system reduces the number of occurrences that a processor must communicate with the system memory via the system communication bus.

To maintain cache and memory coherency, reads and writes of shared information to the system memory are monitored or "snooped". When either a memory read or a memory write of data at an address which is shared by more than one master or cache in the system is detected, this address is used as a snoop address. A snoop request is initiated and directed to one or more cache memories in the system to search for any address in the caches that match the snoop address. A snoop hit occurs for every match, and any needed corrective action is taken to maintain coherency of the data corresponding to the address in the cache where the snoop hit occurs. In one form each cache memory has a snoop storage buffer or queue for storing received snoop requests. When a large number of bus transactions occur, the snoop storage buffer may readily become full. When the queue resources are not available due to the snoop queue being filled to capacity, a flow control mechanism is used to prevent snoop activity from being lost or overrunning the snoop queue. Some existing systems delay responding to a current transaction until resources are available. However, the delay stalls the system bus and blocks bus activity from occurring until the snoop transactions are processed.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
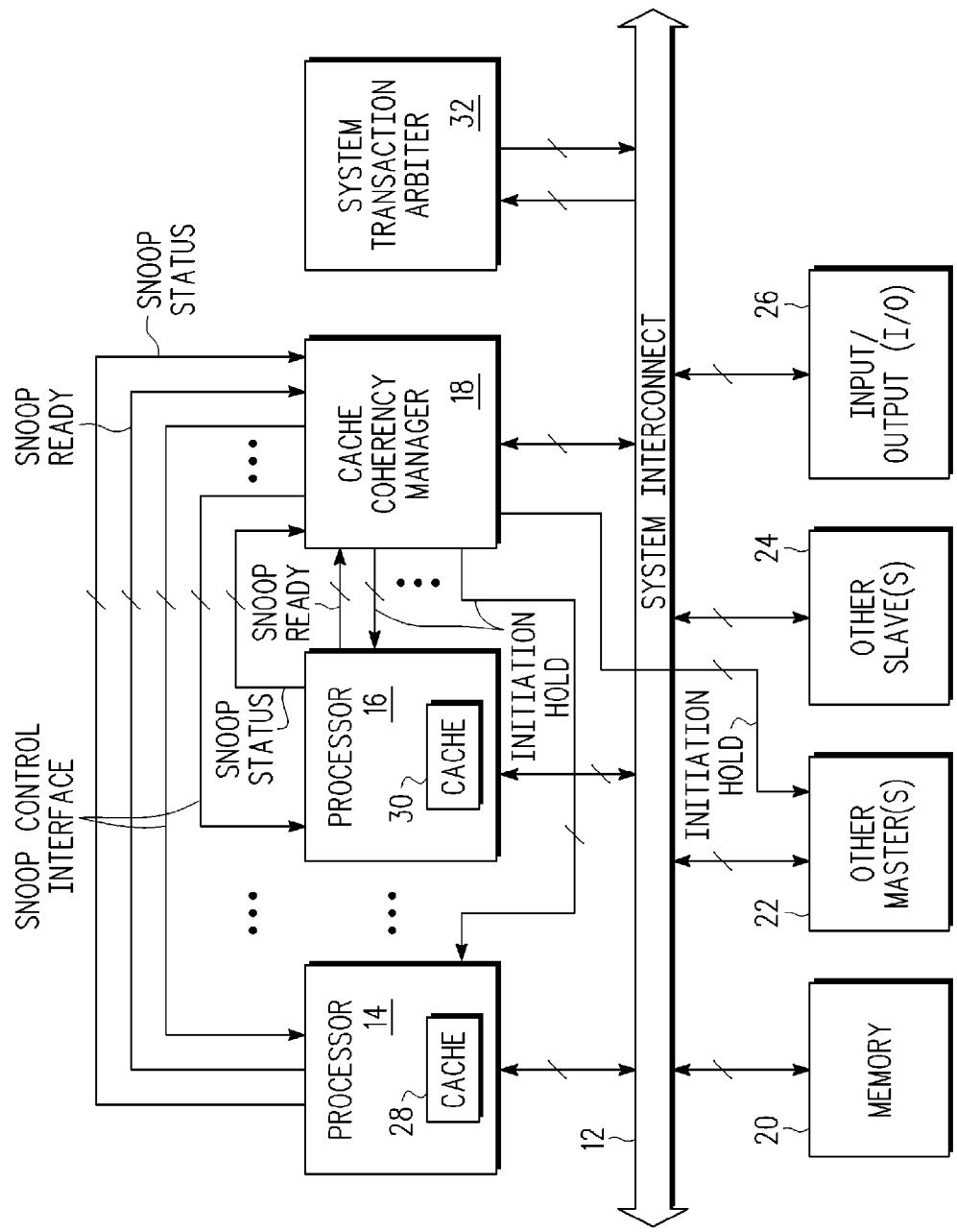
FIG. 1 illustrates in block diagram form a system having selective interconnect transaction control in accordance with the present invention.

Illustrated in FIG. 1 is a data processing system 10 having a plurality of processors, such as a processor 14 and a processor 16 that are connected via a system interconnect 12 via respective bidirectional multiple-bit conductors. Any number of processors may be connected to the system interconnect 12 as is indicated by the dots between processor 14 and processor 16 and associated connecting signaling. The system interconnect 12, in one form, is a communication bus with additional logic circuitry (not shown). In one form the additional logic circuitry implements a crossbar switch and implements a predetermined communication protocol. Within each of the illustrated processors is a local memory such as cache 28 of processor 14 and cache 30 of processor 16. Also connected to the system interconnect 12 via bidirectional multiple-bit conductors is a cache coherency manager 18. Also connected to the system interconnect 12 via respective bidirectional multiple-bit conductors is a system memory 20 and one or more masters of the system interconnect 12 designated as "Other master(s) 22". In additional one or more slave devices, designated as "Other Slave(s) 24", are connected to the system interconnect 12. The system memory 20 is also a slave device. Also connected to the system interconnect 26 via bidirectional multiple-bit conductors is an input/output interface 26. The processor 14 has a first output connected to a first input of the cache coherency manager 18 for providing a Snoop Status signal and has a second output connected to a second input of the cache coherency manager 18 for providing a Snoop Ready signal. A first output of the cache coherency manager 18 is connected to a first input of processor 14 for providing a Snoop Control Interface signal. A second output of the cache coherency manager 18 is connected to a second input of processor 14 for providing an Initiation Hold signal. Similar signal connections between the remaining additional processors of data processing system 10 and the cache coherency manager 18 are provided. For example, processor 16 has a first output connected to a third input of the cache coherency manager 18 for providing a Snoop Ready signal. A third output of the cache coherency manager 18 is connected to a first input of processor 16 for providing a Snoop Control Interface signal. A fourth output of the cache coherency manager 18 is connected to a second input of processor 16 for providing an Initiation Hold signal. The cache coherency manager 18 also has a fifth output for providing an Initiation Hold signal to an input of the other master(s) 22. A system transaction arbiter 32 has an input connected to the system interconnect 12 via a bidirectional multiple-bit conductor, and has an output connected to the system interconnect 12 via a bidirectional multiple-bit conductor.

In operation, the data processing system 10 provides a signaling and control apparatus and method for selectively stalling system interconnect transaction initiation by a master of the system interconnect 12 for a subset of transaction types. The master of the system interconnect 12 has complete use of the system interconnect to the exclusion of all other devices. Processor 14, processor 16 and other master(s) 22 each may become a master of the system interconnect 12 under control or authority of the system transaction arbiter 32. The system transaction arbiter 32 implements any predetermined interconnect mastership arbitration protocol. Many such protocols are defined as an industry standard and are well known and conventional. The system memory 20 functions as the information storage resource for the data processing system 10 and has significantly more capacity than any of the individual caches such as cache 28 and cache 30. The other slave(s) 24 represent one or more slave devices which are not able to become a master of system interconnect 12 and which respond to any of the devices which are a bus master. An example of one of the other slave(s) 24 is a monitor display. The input/output 26 functions as an interface of the data processing system 10 with the external world. In one form the input/output 26 is implemented as a keypad or keyboard interface. Other I/O 26 implementations include a voice synthesizer for converting voice commands to electrical signals and vice versa. The cache coherency manager 18 is connected to the system interconnect 12 and each interconnect master for providing snoop requests to the cache or caches in a bus master device. For example, assume that processor 14 is a first master. The cache coherency manager 18 provides snoop requests to each master device having a cache. In the illustrated form of FIG. 1, each of the processors 14-16 is therefore able to receive a snoop request via a respective Snoop Control Interface signal. In addition, in response to processing a snoop request, snoop status information associated with the snoop operation performed by the caches within processors 14-16 may be returned to cache coherency manager 18 via the respective Snoop Status signals from processors 14-16. Assume initially that the cache coherency manager 18 provides a snoop request to processor 14, the first master. The snoop request is stored by processor 14. The processor 14 then proceeds to perform a snoop operation, as will be explained below, to determine whether or not previously stored snoop addresses are in that processor's cache. Prior to or concurrent with the snoop request storage capacity of processor 14 reaching full capacity, the processor 14 negates the Snoop Ready signal to the cache coherency manager 18. In response to receiving the negated Snoop Ready signal from processor 14, the cache coherency manager 18 provides an Initiation Hold signal to the other masters, including processor 16 as a second master and to the other master(s) 22, but not to processor 14, unless the Snoop Ready signal of another cache other than the cache of processor 14 is also negated. The Initiation Hold signal functions to signal to the second master, processor 16, and to the other master(s) 22 that those masters cannot initiate any transactions within a subset of transaction types to the system interconnect 12 while the Initiation Hold signal remains asserted. In one form the subset of transaction types that those masters cannot initiate are any transactions that require cache coherency or a potential cache coherency operation.

The system transaction arbiter 32 is selectively overridden locally at each master that receives an Initiation Hold signal from the cache coherency manager 18. When the cache coherency manager 18 provides the Initiation Hold signal to the processor 16, processor 16 is prevented from initiating any transactions requiring cache coherency to the system interconnect 12 regardless of any grant signal from the system transaction arbiter 32 that grants processor 16 mastership of or access to the system interconnect 12. In one embodiment, transactions which require cache coherency may be any type of transaction that contains or uses shared cacheable information. For example, one type of transaction requiring cache coherency is a global write transaction to shared memory. While the Initiation Hold signal is asserted by the cache coherency manager 18 to processor 16, the processor 16 may nonetheless initiate a transaction to the system interconnect 12 that is not a transaction requiring cache coherency if the system transaction arbiter 32 is granting master ownership status to processor 16. Similarly, if the system transaction arbiter 32 is granting processor 14 master ownership status, the processor 14 may initiate any type of transaction to the system interconnect 12 in order to make room for its bus snoop storage circuitry, or may initiate any other type of transaction, as long as no Initiation Hold signal is asserted to processor 14. Therefore, the Initiation Hold signal, when asserted to processor 16, prevents outgoing transaction control circuitry within processor 16 from initiating any outgoing transactions that require cache coherency to the system interconnect 12. These transactions represent only a subset of the transaction types which processor 16 is able to generate. Additional transactions which do not require coherency to be maintained may also be initiated by processor 16 or any of the other masters within data processing system 10.

In one embodiment, each transaction on the system interconnect 12 has an associated transaction type or attribute indicative of the need for maintaining cache coherency. This associated indication may be used by cache coherency manager 18 in determining the need to present snoop requests to one or more caches in data processing system 10. The associated type or attribute indicating coherency that is required for a particular transaction may be generated in any appropriate conventional method. For example, a memory management unit within a master may provide a page attribute corresponding to each page of memory accessed by a master which indicates whether memory or cache coherency is required. In one embodiment, this attribute may be known as a "M" attribute, meaning memory coherence is required. In an alternate embodiment, the attribute may be known as a "G" or "SG" attribute, indicating the address is a "global" or "shared global" attribute, indicating that the associated memory page is shared among multiple caches or processors/masters, and thus requires that coherency operations take place for transactions to that page of memory addresses. Other embodiments may indicate the associated need for a coherency operation in alternate ways.

It should also be understood that the cache coherency manager 18 may be implemented with various functionality. In one form the cache coherency manager 18 may be implemented with circuitry that monitors all transactions on the system interconnect 12. In this form the cache coherency manager 18 is monitoring all transactions whether the transaction is one requiring cache coherency or not. In other forms the cache coherency manager 18 is implemented to monitor only those transactions on the system interconnect 12 that require cache coherency. The cache coherency manager 18 is implemented with logic circuitry (not shown) to implement the monitoring function and therefore will not be further detailed.

Figure 2:
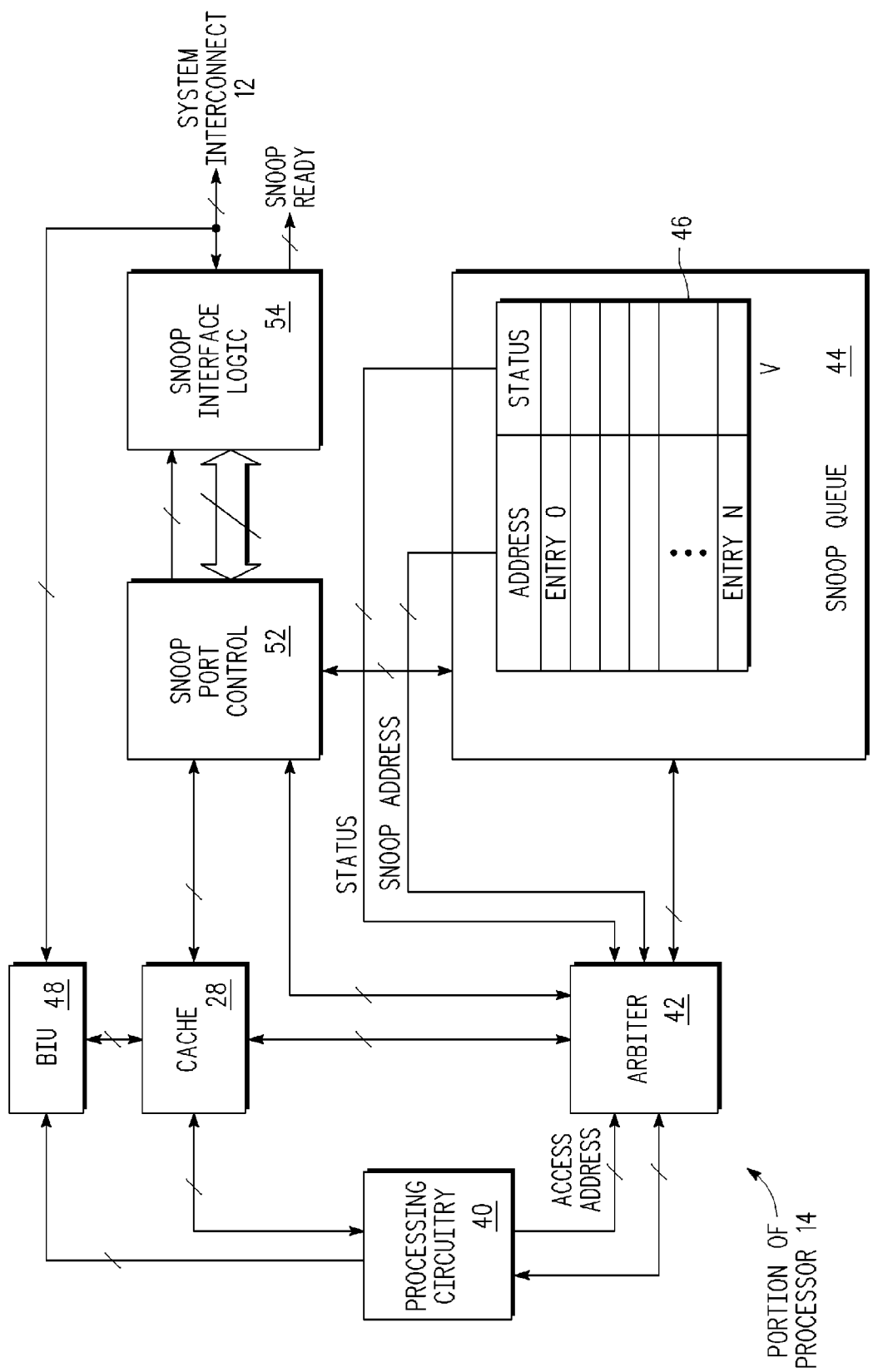
FIG. 2 illustrates in block diagram form a portion of a portion of a processor illustrated in FIG. 1 that is related to cache memory snooping.

Illustrated in FIG. 2 is further detail of a portion of the processor 14 which further details cache 28 of processor 14 and associated cache snooping circuitry. Reference elements illustrated in FIG. 2 that are common with reference elements of FIG. 1 are numbered the same. A bus interface unit 48, labeled BIU, has a first input connected via a bidirectional multiple-bit conductor to the system interconnect 12. Processing circuitry 40 of the processor 14 has a first output that is connected to a second input of the bus interface unit 48. An input/output terminal of the bus interface unit 48 is connected to a first input/output terminal of cache 28. A second input/output terminal of the cache 28 is connected via a bidirectional multiple-bit conductor to a first input/output terminal of the processing circuitry 40. A third input/output terminal of the cache 28 is connected via a bidirectional multiple-bit conductor to a first input/output terminal of an arbiter 42. A fourth input/output terminal of the cache 28 is connected to a first input/output terminal of snoop port control circuitry 52. A second output of the processing circuitry 40 is connected to a first input of the arbiter 42 for providing an access address. A second input/output terminal of the processing circuitry 40 is connected to a second input/output terminal of arbiter 42. The snoop port control circuitry 52 has a second input/output terminal connected to a third input/output terminal of the arbiter 42. Snoop queue circuitry is formed by the combination of the snoop port control circuitry 52, a snoop interface logic 54 and a snoop queue 44. An output of the snoop port control 52 is connected to an input of snoop interface logic 54.

A third input/output terminal of the snoop port control 52 is connected to a first input/output terminal of the snoop interface logic 54. A second input/output terminal of the snoop interface logic 54 is connected to the system interconnect 12. An output of the snoop interface logic 54 provides the Snoop Ready signal. The snoop queue 44 is a storage device such as a buffer for storing (N+1) entries that are each a snoop address, where N is an integer. The snoop queue 44 is illustrated in FIG. 2 as a table with a plurality of entries identified by an address. For each entry address, there is a correlated or associated status field. In the illustrated form the status field is a validity field, V. The snoop queue 44 has a first output connected to a second input of the arbiter 42 for providing a snoop address from the stored (N+1) entries. A second output of the snoop queue circuitry 44 is connected to a third input of the arbiter 42 for providing status information associated with each snoop address. This status information may be provided to indicate that the current snoop address is valid and that a request for snoop lookup to arbiter 42 is valid. A fourth input/output terminal of the arbiter 42 is connected to a first input/output terminal of the snoop queue 44 for providing access control. This access control is used to handshake snoop requests and snoop grants and coordinates the operation of the snoop queue circuitry 44. A fourth input/output terminal of the snoop port control 52 is connected to a second input/output terminal of the snoop queue 44 for providing snoop addresses from the system interconnect 12 to the snoop queue 44.

In operation, the portion of processor 14 illustrated in FIG. 2 functions to efficiently snoop information communicated on the system interconnect 12 to keep cache 28 coherent with other copies of the information that cache 28 is storing. The snoop interface logic 54 receives all of the information communicated on system interconnect 12 and selectively communicates addresses to the snoop queue circuitry 44 that are potentially stored in cache 28 via the snoop port control 52. The arbiter 42 arbitrates access to the cache 28 between the processing circuitry 40 and the snoop port control 52 in an efficient manner to minimize the time that processing circuitry 40 does not have access to cache 28. Arbiter 42 provides access addresses to cache 28 either from processing circuitry 40 or from the snoop queue circuitry 44. When arbiter 42 provides the snoop queue circuitry 44 with access to the cache 28, access addresses from the processor 40 are no longer coupled to the cache 28 via the arbiter 42. In this mode of operation the arbiter 42 provides the snoop addresses from the snoop request queue 46 to the cache 28. The snoop addresses are removed from the snoop request queue 46 on a first-in, first-out (FIFO) basis. When a snoop address is present in the snoop request queue 46, the Snoop queue circuitry 44 signals the arbiter 42 to request the arbiter to arbitrate for access to the cache 28. The cache 28 has a single set of address tags and therefore must be either dedicated to the processor for addressing or to the snoop queue circuitry 44 for addressing. When arbiter 42 removes access by the processing circuitry 40 to the cache 28, snoop addresses are routed through the arbiter 42 to the cache 28. Circuitry within the cache 28 compares the snoop address with all the addresses presently stored in the cache 28. In one embodiment, if a match occurs the matching entry in the cache 28 is marked as invalid since a potentially different form of the entry has been communicated on system interconnect 12. If no match occurs no further action is taken within the cache 28. In an alternate embodiment, a match may result in other coherency actions, such as supplying data from cache 28 corresponding to the snoop address to system interconnect 12 via snoop port control 52 and snoop interface logic 54 in order to properly implement a selected cache coherency protocol. The arbiter 42 arbitrates access to the cache 28 between the processing circuitry 40 and the snoop queue 44. The arbiter 42 routes the correlated status information for the snoop address during a snoop operation within cache 28 to the Snoop Interface logic 54 via the snoop port control 52. In one form the status information indicates the validity of the correlated cache entry and may be implemented as a single bit status signal. The snoop port control 52 monitors the snoop queue 44 and determines when the snoop queue 44 has stored information waiting to be processed by the processing circuitry 40, arbiter 42 and cache 28. In response to determining the fullness of snoop queue 44 and the availability of additional entries in snoop queue 44 for storing additional snoop requests, the snoop port control 52 creates the Snoop Ready signal which is output via the snoop interface logic 54 to the cache coherency manager 18.

Figure 3:
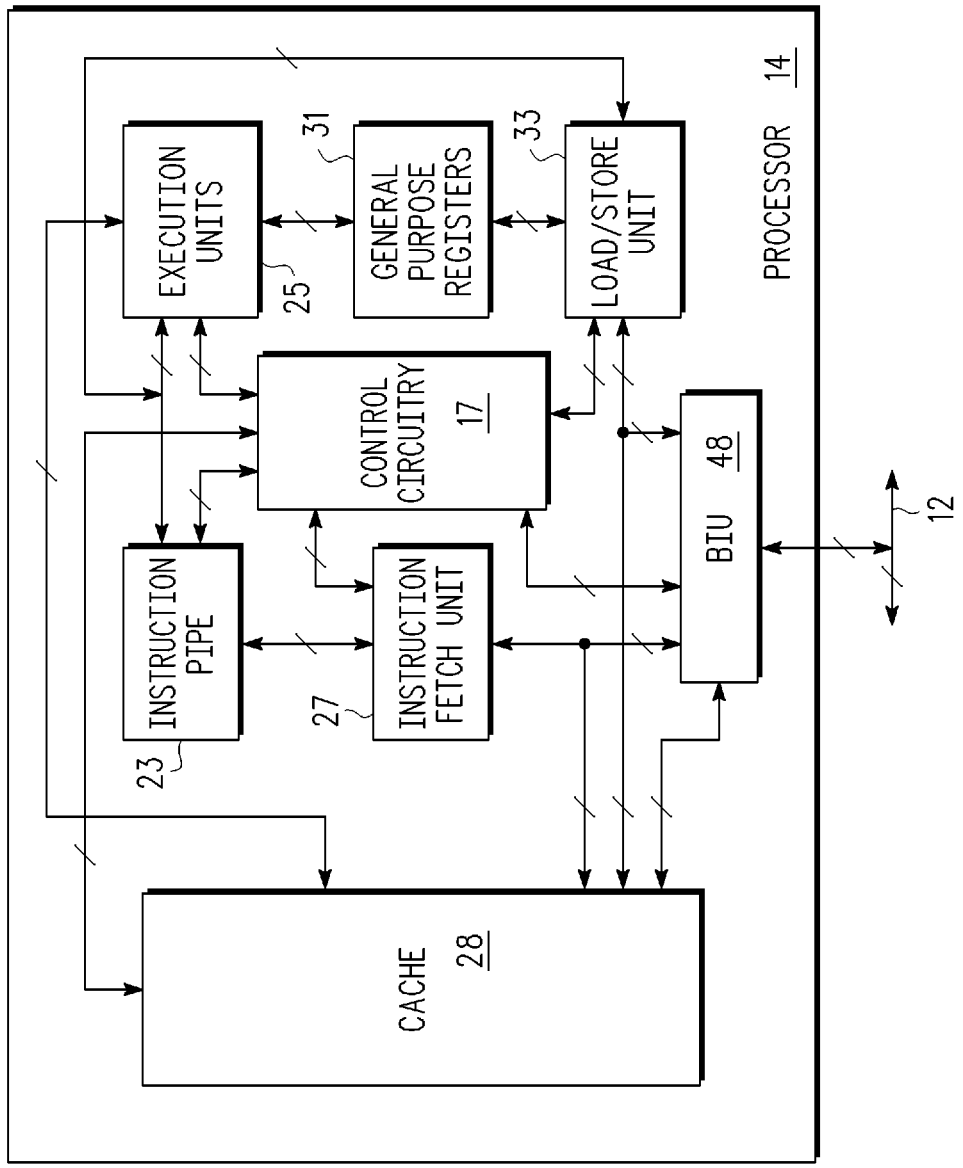
FIG. 3 illustrates in block diagram form an exemplary form of the processor of FIG. 1 in accordance with the present invention.

Illustrated in FIG. 3 is another portion of processor 14 which further details the control circuitry within processor 14 between the cache 28 and the bus interface unit 48. Elements which are common with those of FIG. 1 and FIG. 2 are numbered the same in FIG. 3. The bus interface unit 48 is connected to the system interconnect 12 and to cache 28 as previously described. A second input/output terminal of bus interface unit 48 is connected to a fifth input/output terminal of cache 28 and to a first input/output terminal of the instruction fetch unit 27. A third input/output terminal of bus interface unit 48 is connected to a first input/output terminal of control circuitry 17. A fourth input/output terminal of the bus interface unit 48 is connected to a sixth input/output terminal of cache 28 and to a first input/output terminal of a load/store unit 33. A second input/output terminal of the instruction fetch unit 27 is connected to a first input/output terminal of an instruction pipe or instruction pipeline 23. A second input/output terminal of instruction pipeline 23 is connected to a first input/output terminal of execution units 25. The execution units 25 generally include units such as a floating point unit, an integer unit and other processing units. A third input/output terminal of instruction pipeline 23 is connected to a second input/output terminal of control circuitry 17. A third input/output terminal of the instruction fetch unit 27 is connected to a third input/output terminal of control circuitry 17. A fourth input/output terminal of cache 28 is connected to a fourth input/output terminal of the control circuitry 17. A fifth input/output terminal of control circuitry 17 is connected to a second input/output terminal of the execution units 25. A third input/output terminal of execution units 25 is connected to the second input/output terminal of cache 28. A fourth input/output terminal of execution units 25 is connected to a first input/output terminal of general purpose registers 31. A second input/output terminal of general purpose registers 31 is connected to a second input/output terminal of the load/store unit 33. A third input/output terminal of the load/store unit 33 is connected to the second input/output terminal of instruction pipeline 23 and to the first input/output terminal of execution units 25. A fourth input/output terminal of the load/store unit 33 is connected to a sixth input/output terminal of the control circuitry 17.

In operation the control circuitry 17 of processor 14 functions to control and coordinate the bus interface unit 48 and cache 28 operations as well as the instruction fetch, decode and various execution units of processor 14. Under control of the control circuitry 17, instructions are coupled via the bus interface unit 48 into the instruction fetch unit 27 and placed in the instruction pipeline 23. The instructions are sequentially executed by the execution units 25 and results are stored off in the general purpose registers 31. The load/store unit 33 operates under control of the control circuitry 17 to load information needed for processing by the execution units 25 and to store information from the general purpose registers 31 for providing to the cache 28 and/or the system interconnect 12. Therefore, the portion of processor 14 detailed in FIG. 3 illustrates the instruction execution operation of processor 14 separate from the cache coherency management function.

Figure 4:
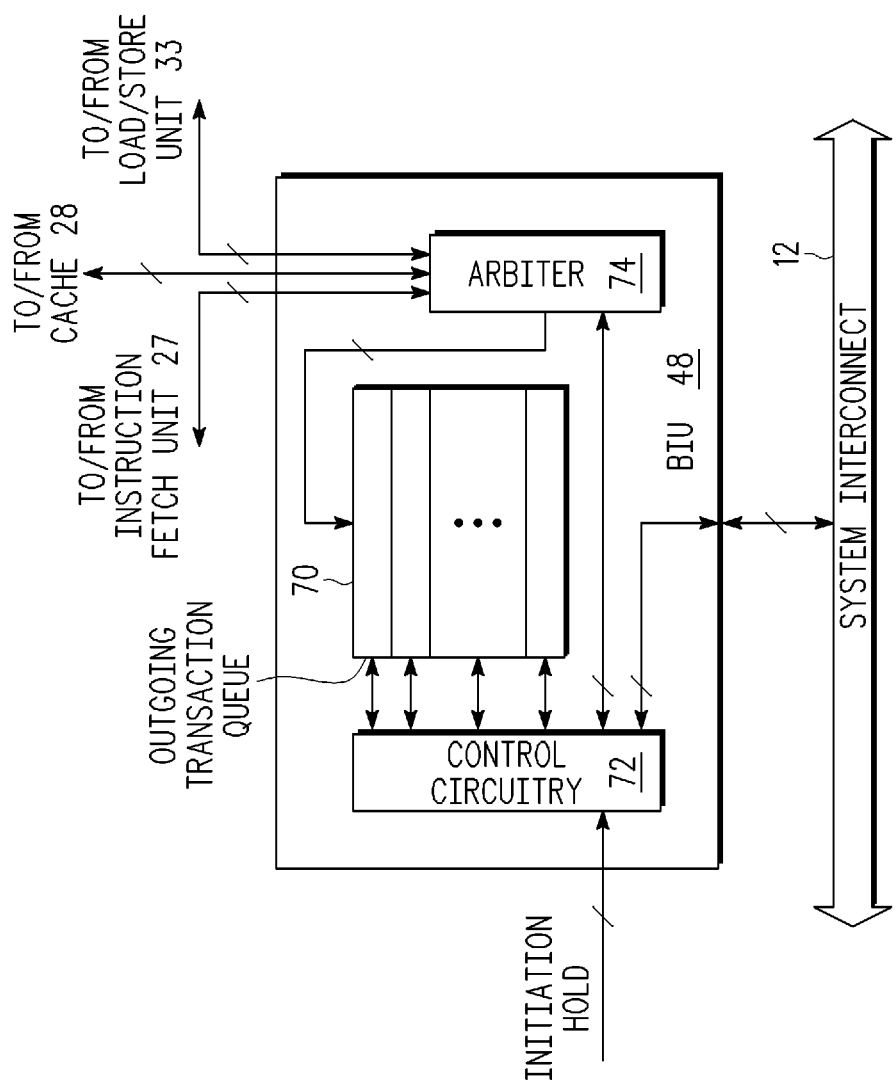
FIG. 4 illustrates in block diagram form an embodiment of a bus interface unit of the processor of FIG. 3.

Illustrated in FIG. 4 is a detail of one form of a portion of the bus interface unit 48 with respect to the cache coherency maintenance function. Again, elements in FIG. 4 that are common with elements in any of FIGS. 1-3 are commonly numbered. An outgoing transaction queue 70 is provided having a plurality of storage entries represented in FIG. 4 by a plurality of successive rows. An input to the outgoing transaction queue 70 is connected to an output of an arbiter 74. The arbiter 74 has a first input/output terminal connected to and from the instruction fetch unit 27. Arbiter 74 has a second input/output terminal connected to and from the cache 28. Arbiter 74 has a third input/output terminal connected to and from the load/store unit 33. The control circuitry 72 is connected to the outgoing transaction queue 70, to the arbiter 74, and to the system interconnect 12. An input of the control circuitry 72 receives the Initiation Hold signal from the cache coherency manager 18 of FIG. 1. Control circuitry 72 has a plurality of input/output terminals, each of which is connected to a predetermined entry of the outgoing transaction queue 70. The control circuitry 72 also has an input/output terminal that is connected to a fourth input/output terminal of arbiter 74.

In operation, the bus interface unit 48 provides a connection between processor 14 and the system interconnect 12 for transferring control and data information. The control information path between the I/O terminal and control circuitry 72 is expressly shown in FIG. 4. A data path (not shown) exists between the I/O terminal and the Outgoing Transaction Queue 70. Arbiter 74 directly loads the Outgoing Transaction Queue 70 with information from one of the instruction fetch unit 27, the cache 28 or the load/store unit 33. The data path between the system interconnect 12 and the arbiter 74 for communicating information with the cache 28 that is illustrated in FIG. 2 is not detailed in FIG. 4 which is focused on the outgoing transactions. The Initiation Hold signal is received from the cache coherency manager 18 and provided to the control circuitry 72. The control circuitry 72 is outgoing transaction control circuitry which controls initiation of outgoing transactions to the system interconnect 12. In response, the control circuitry 72 functions to determine which entries in the outgoing transaction queue 70 are outgoing transactions that require cache coherency. When control circuitry 72 identifies such transactions, such as write and read transactions, the control circuitry 72 inhibits those transactions from being placed on the system interconnect 12 when processor 14 is granted master status by the system transaction arbiter 32 and the Initiation Hold signal is asserted. However, control circuitry 72 does allow transactions within the outgoing transaction queue 70 that do not require cache coherency to be output onto system interconnect 12 when processor 14 is granted master status regardless of the state of the Initiation Hold signal. Upon release or de-assertion of the Initiation Hold signal the previously held-up transactions may be permitted to be communicated in due course when processor 14 is granted mastership of system interconnect 12. The control circuitry 72 can be implemented with various functionality in determining what set of transactions to block in response to the Initiation Hold signal. For example, in one form the Initiation Hold signal may be implemented to stall or hold up only global write transactions from a master. These global write accesses are write accesses to portions of memory that are shared between multiple masters in the data processing system 10 and thus must remain cache coherent. Other non-global write accesses, which are write accesses to portions of memory 20 which are private to a selected master, do not require cache coherency operations, and thus will not result in snoop requests to caches of other masters being requested by coherency manager 18. Therefore, regardless of the inability of snoop queue logic (not shown) within other caches to accept additional snoop requests, these non-global write accesses may be performed. Other accesses which do not require cache coherency, and therefore do not require snoop requests to be generated by cache coherency manager 18 to caches within data processing system 10 may also proceed, regardless of the fullness of one or more snoop queues within data processing system 10. In general, global write transactions represent a small percentage of interconnect accesses. Therefore, the selective stalling of the global write transactions permits significant interconnect traffic to occur unimpeded and thereby permit the limited number of snoop queue resources in a data processing system to be optimized. Because only a small subset of interconnect transactions are delayed, as opposed to stalling the entire data processing system interconnect, minimal impact to the system occurs while obtaining significant performance increases. Most transactions or transactions from other masters within the system are permitted to continue unimpeded and permit the system to perform useful work. As described herein, the Initiation Hold signal functions cooperatively with the arbiter 74 within a master's bus interface unit to selectively re-order or re-prioritize pending transactions to allow certain queued outgoing transactions to proceed in an alternate order, based on the assertion or negation of the Initiation Hold signal to the master.

By now it should be appreciated that there has been provided an interconnect transaction flow control mechanism for cache coherency maintenance. An efficient flow control system and method prevents snoop activity from being lost or overrunning a snoop queue. The system disclosed herein is significantly more efficient than delaying response to a current transaction until snoop queue resources are available. Such a delay would create an undesired bottleneck in the system by blocking all subsequent interconnect activity while waiting for a response.

In one form there is herein provided a data processing system having a first master and a second master. The first master has a cache and snoop queue circuitry having a snoop request queue which stores snoop requests. The snoop queue circuitry receives snoop requests for storage into the snoop request queue and provides snoop requests from the snoop request queue to the cache. The snoop queue circuitry provides a ready indicator indicating whether the snoop request queue can store more snoop requests. The second master has outgoing transaction control circuitry which controls initiation of outgoing transactions to a system interconnect. In response to the ready indicator indicating that the snoop request queue cannot store more snoop requests, an initiation hold signal is provided to the outgoing transaction control circuitry to prevent the outgoing transaction control circuitry from initiating any outgoing transactions to the system interconnect within a subset of transaction types. In another form an outgoing transaction queue is coupled to the outgoing transaction control circuitry. The outgoing transaction queue stores pending outgoing transactions to the system interconnect. An outgoing transaction arbiter arbitrates transactions and provides pending outgoing transactions for storage into the outgoing transaction queue. In another form when the outgoing transaction control circuitry is prevented from initiating any outgoing transactions to the system interconnect within the subset of transaction types, the outgoing transaction control circuitry initiates a transaction to the system interconnect from the outgoing transaction queue that is not within the subset of transaction types. In yet another form the outgoing transaction control circuitry is prevented from initiating any outgoing transactions to the system interconnect within the subset of transaction types. The outgoing transaction arbiter re-prioritizes at least one pending outgoing transaction within the outgoing transaction queue. In another form when the outgoing transaction control circuitry receives an asserted grant signal for the system interconnect from a system arbiter which arbitrates accesses to the system interconnect and the initiation hold signal is preventing the outgoing transaction control circuitry from initiating any outgoing transactions to the system interconnect within the subset of transaction types, the initiation hold signal continues to prevent the outgoing transaction control circuitry from initiating any outgoing transactions to the system interconnect within the subset of transaction types regardless of the asserted grant signal. In yet another form the subset of transaction types is characterized as transactions requiring cache coherency. In yet another form the subset of transaction types is characterized as global write transactions. In yet another form the snoop queue circuitry, after negating the ready indicator to indicate that the snoop request queue cannot store more snoop requests, accepts up to a predetermined number of additional snoop requests for storage into the snoop request queue.

In another form there is herein provided a method in which there is snooping of a system interconnect to provide snoop requests to a snoop queue of a first master. The snoop queue of the first master provides snoop requests to a cache of the first master. A ready indicator is provided to indicate whether the snoop queue of the first master can receive more snoop requests for storage into the snoop queue. In response to the ready indicator indicating that the snoop queue of the first master cannot receive more snoop requests for storage into the snoop queue, a second master is prevented from initiating any transaction within a subset of transaction types to the system interconnect. In another form the subset of transaction types is characterized as transactions requiring cache coherency. In yet another form the subset of transaction types is characterized as global write transactions. In yet another form the ready indicator is provided by negating the ready indicator to indicate that the snoop queue cannot receive more snoop requests for storage into the snoop queue. After negating the ready indicator, at least one additional snoop request is accepted. In another form a snoop acknowledge indicator is provided to indicate when a snoop request from the snoop queue has been processed by the cache. In another form the second master receives an asserted grant signal which grants the second master access to the system interconnect, wherein the second master is prevented from initiating any transaction within the subset of transaction types to the system interconnect is performed regardless of the asserted grant signal. In another form the second master is prevented from initiating any transaction within a subset of transaction types to the system interconnect by providing an asserted initiation hold signal to the second master, wherein the second master stops initiating any transaction within the subset of transaction types to the system interconnect in response to the asserted initiation hold signal.

In yet another form there is herein provided a data processing system having a system interconnect, a first master and a second master. The first master is coupled to the system interconnect, the first master having a cache and a snoop queue, the snoop queue coupled to provide snoop requests to the cache. The second master is coupled to the system interconnect. A cache coherency manager is coupled to the system interconnect, wherein the cache coherency manager provides snoop requests to the snoop queue of the first master, receives a ready indicator from the first master, and provides an initiation hold signal to the second master. When the first master provides the ready indicator to the cache coherency manager to indicate that the snoop request queue is full and cannot receive more snoop requests from the cache coherency manager, the cache coherency manager provides the initiation hold signal to the second master to prevent the second master from initiating any transactions to the system interconnect within a subset of transaction types. In another form the subset of transaction types is characterized as transactions requiring cache coherency. In another form there is further provided a system arbiter coupled to the system interconnect to arbitrate accesses on the system interconnect. When the cache coherency manager provides the initiation hold signal to the second master to prevent the second processor from initiating any transactions to the system interconnect within the subset of transaction types, the initiation hold signal continues to prevent the second master from initiating any transactions to the system interconnect with the subset of transaction types regardless of any grant signal from the system arbiter granting the second master access to the system interconnect. In another form when the cache coherency manager provides the initiation hold signal to the second master to prevent the second master from initiating any transactions to the system interconnect within the subset of transaction types. The second master initiates a transaction to the system interconnect which is not within the subset of transaction types and the first master initiates any type of transaction to the system interconnect. In yet another form a third bus master is coupled to the system interconnect, wherein the cache coherency manager provides a second initiation hold signal to the third bus master. When the first master provides the ready indicator to the cache coherency manager to indicate that the snoop request queue is full and cannot receive more snoop requests from the cache coherency manager, the cache coherency manager also provides the second initiation hold signal to the third master to prevent the third master from initiating any transactions to the system interconnect within the subset of transaction types.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary memory system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is implemented in a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, any type of memory cache, synchronous or asynchronous, may be used. Various types of memory circuits including dynamic random access memory (DRAM), synchronous random access memory (SRAM), magnetoresistive random access memory (MRAM), FLASH, shift registers and addressable storage registers may be used to implement the cache. Various system interconnect or bus protocols could be implemented. In other embodiments system components in addition to those used in FIG. 1 may be provided. It should be understood that all circuitry described herein may be implemented either in silicon or another semiconductor material or alternatively by software code representation of silicon or another semiconductor material. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. Accordingly, the specification and figures are to be regarded in an illustrative rather than a restrictive sense, and all such modifications are intended to be included within the scope of the present invention.

What is claimed is:

1. A data processing system, comprising:
   a first master, the first master comprising:
      a cache; and
      snoop queue circuitry having a snoop request queue which stores snoop requests, the snoop queue circuitry receives snoop requests for storage into the snoop request queue and provides snoop requests from the snoop request queue to the cache, the snoop queue circuitry providing a ready indicator indicating whether the snoop request queue can store more snoop requests; and
   a second master, the second master comprising outgoing transaction control circuitry which controls initiation of outgoing transactions to a system interconnect,
      wherein in response to the ready indicator indicating that the snoop request queue cannot store more snoop requests,
         an initiation hold signal is provided to the outgoing transaction control circuitry to prevent the outgoing transaction control circuitry from initiating any outgoing transactions to the system interconnect within a subset of transaction types wherein the subset of transaction types comprises global write transactions, and
         the outgoing transaction control circuitry is configured to initiate all other memory accesses not within the subset of transaction types.

2. The data processing system of claim 1, further comprising:
   an outgoing transaction queue coupled to the outgoing transaction control circuitry, the outgoing transaction queue storing pending outgoing transactions to the system interconnect; and
   an outgoing transaction arbiter which arbitrates transactions and provides pending outgoing transactions for storage into the outgoing transaction queue.

3. The data processing system of claim 2, wherein when the outgoing transaction control circuitry is prevented from initiating any outgoing transactions to the system interconnect within the subset of transaction types, the outgoing transaction control circuitry initiates a transaction to the system interconnect from the outgoing transaction queue that is not within the subset of transaction types.

4. The data processing system of claim 2, wherein when the outgoing transaction control circuitry is prevented from initiating any outgoing transactions to the system interconnect within the subset of transaction types, the outgoing transaction arbiter re-prioritizes at least one pending outgoing transaction within the outgoing transaction queue.

5. The data processing system of claim 2, wherein when the outgoing transaction control circuitry receives an asserted grant signal for the system interconnect from a system arbiter which arbitrates accesses to the system interconnect and the initiation hold signal is preventing the outgoing transaction control circuitry from initiating any outgoing transactions to the system interconnect within the subset of transaction types, the initiation hold signal continues to prevent the outgoing transaction control circuitry from initiating any outgoing transactions to the system interconnect within the subset of transaction types regardless of the asserted grant signal.

6. The data processing system of claim 1, wherein the snoop queue circuitry, after negating the ready indicator to indicate that the snoop request queue cannot store more snoop requests, accepts up to a predetermined number of additional snoop requests only from the first master for storage into the snoop request queue.

7. A method comprising:
  snooping a system interconnect to provide snoop requests to a snoop queue of a first master, wherein the snoop queue of the first master provides snoop requests to a cache of the first master;
  providing a ready indicator to indicate whether the snoop queue of the first master can receive more snoop requests for storage into the snoop queue; and
  in response to the ready indicator indicating that the snoop queue of the first master cannot receive more snoop requests for storage into the snoop queue,
  preventing a second master from initiating any transaction within a subset of transaction types to the system interconnect, wherein the subset of transaction types is characterized as only global write transactions, and
  allowing the second master to initiate all other memory accesses not within the subset of transaction types.

8. The method of claim 7, wherein providing the ready indicator comprises:
  negating the ready indicator to indicate that the snoop queue cannot receive more snoop requests for storage into the snoop queue; and
  after negating the ready indicator, accepting at least one additional snoop request.

9. The method of claim 7, further comprising:
  providing a snoop acknowledge indicator to indicate when a snoop request from the snoop queue has been processed by the cache.

10. The method of claim 7, further comprising:
  the second master receiving an asserted grant signal which grants the second master access to the system interconnect, wherein the preventing the second master from initiating any transaction within the subset of transaction types to the system interconnect is performed regardless of the asserted grant signal.

11. The method of claim 7, wherein the preventing the second master from initiating any transaction within a subset of transaction types to the system interconnect comprises providing an asserted initiation hold signal to the second master, wherein the second master stops initiating any transaction within the subset of transaction types to the system interconnect in response to the asserted initiation hold signal.

12. A data processing system, comprising:
  a system interconnect;
  a plurality of masters coupled to the system interconnect, wherein
    each master of the plurality of masters comprises a corresponding cache and snoop queue, and
    each snoop queue is coupled to provide snoop requests to the corresponding cache;
  a cache coherency manager, distinct from the plurality of masters and coupled to the system interconnect, and configured to
    provide snoop requests to any snoop queue,
    receive a ready indication from any master of the plurality of masters,
    provide an initiation hold signal to all other masters of the plurality of masters, wherein
      when the master of the plurality of masters provides the ready indicator to the cache coherency manager to indicate that the corresponding snoop queue is full and cannot receive more snoop requests from the cache coherency manager, the cache coherency manager provides the initiation hold signal,
      in response to the initiation hold signal, the other masters of the plurality of masters cease initiating any transactions to the system interconnect within a subset of transaction types wherein the subset of transaction types is characterized as only global write transactions, and
      further in response to the initiation hold signal, the other masters continue to initiate all other transactions that do not include the subset of transaction types.

13. The data processing system of claim 12, further comprising:
  a system arbiter coupled to the system interconnect to arbitrate accesses on the system interconnect, wherein when the cache coherency manager provides the initiation hold signal, the initiation hold signal continues to prevent the other masters from initiating any transactions to the system interconnect with the subset of transaction types regardless of any grant signal from the system arbiter granting any of the other masters access to the system interconnect.

14. The data processing system of claim 12, wherein when the cache coherency manager provides the initiation hold signal, any of the other masters initiates a transaction to the system interconnect which is not within the subset of transaction types and the master providing the ready indication initiates any type of transaction to the system interconnect.

15. The data processing system of claim 12, further comprising:
  a third bus master coupled to the system interconnect, wherein the cache coherency manager provides a second initiation hold signal to the third bus master, wherein when the master provides the ready indicator to the cache coherency manager to indicate that the snoop request queue is full and cannot receive more snoop requests from the cache coherency manager, the cache coherency manager also provides the second initiation hold signal to the third master to prevent the third master from initiating any transactions to the system interconnect within the subset of transaction types.

* * * * *